Dec. 21, 1926.
D. M. DIGGS
1,611,821
EGG CARRYING RECEPTACLE
Filed May 19, 1924
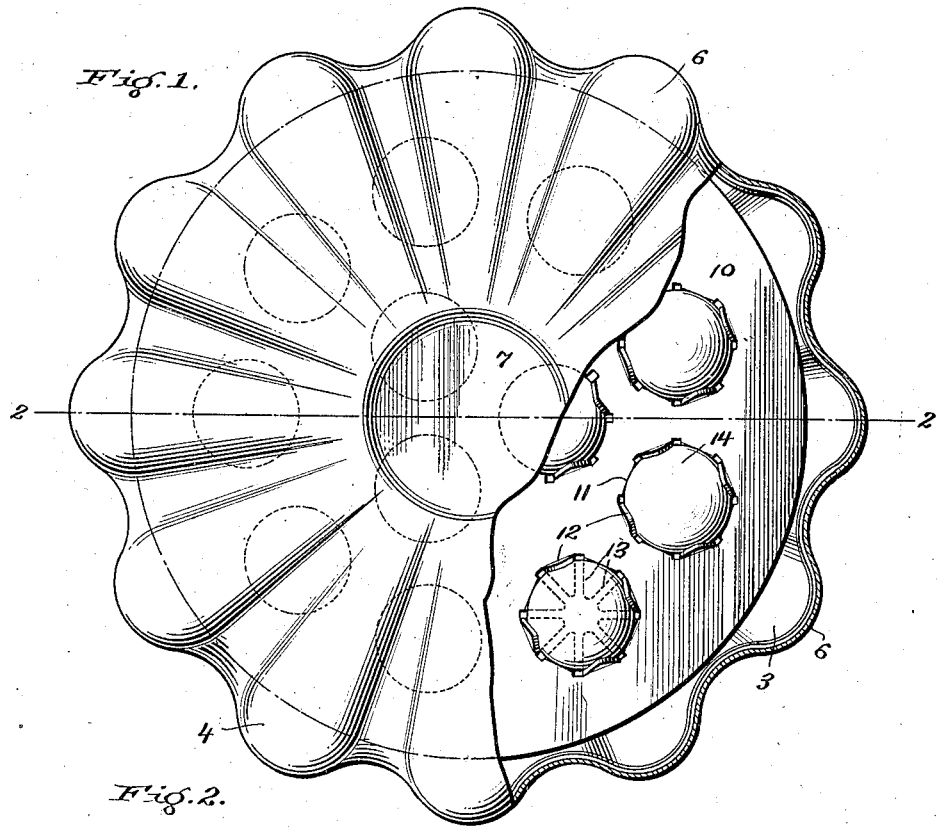
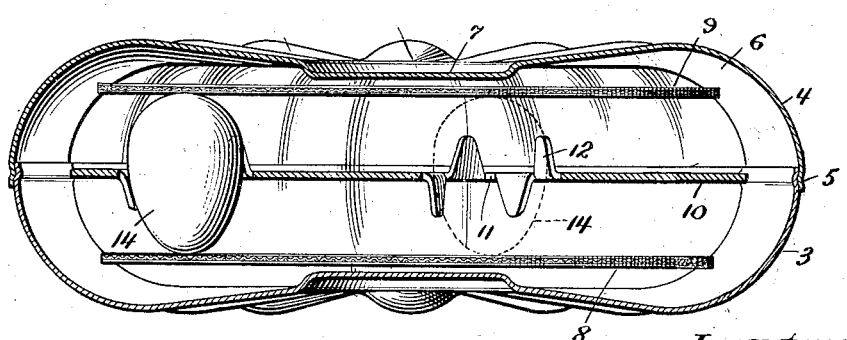
Inventor:
Dudley M. Diggs
by Alfred E. Babbs
His Attorney Patented Dec. 21, 1926.

1,611,821

UNITED STATES PATENT OFFICE.

DUDLEY M. DIGGS, OF SCHENECTADY, NEW YORK, ASSIGNOR OF ONE-HALF TO HENRY E. BUTLER, OF SCHENECTADY, NEW YORK.

EGG-CARRYING RECEPTACLE.

Application filed May 19, 1924. Serial No. 714,199.

The present invention relates to receptacles for carrying fragile articles and especially receptacles for carrying eggs, although it is not necessarily limited to such particular use.

The primary object of my invention is to provide an improved receptacle of the character referred to which, while offering good protection to the eggs contained in it, is at the same time simple in structure and capable of being manufactured at a low cost.

A further object of my invention is to provide a receptacle wherein the eggs are mounted compactly so that the receptacle is of minimum size.

A further object of my invention is to provide a receptacle wherein the eggs are protected in all directions by air cushions and wherein rounding surfaces are provided for taking and distributing shocks and blows.

For a consideration of what I believe to be novel and my invention, attention is directed to the accompanying description and the claims appended thereto.

In the drawing, Fig. 1 is a top plan view with certain parts broken away of a receptacle embodying my invention, and Fig. 2 is a sectional view taken on line 2—2, Fig. 1.

Referring to the drawing, the receptacle comprises a casing made up of two parts 3 and 4 which are joined together at their edges by telescoping one within the other for a short distance. They may be fastened together in any suitable manner such as for example, by means of the surrounding beads 5 which engage one within the other. The two parts 3 and 4 may be exactly alike which is of advantage from a manufacturing standpoint in that it requires the manufacture of a piece of only one kind.

The receptacle is curvilinear in shape being preferably round and each part is provided with rather deep corrugations 6 which extend from the outer edge radially toward the center and merge into a central flat portion 7. This means that when the two parts of the receptacle are assembled as shown in Fig. 2, there are continuous corrugations extending in all directions from the center 7 of one part radially around the receptacle to the center 7 of the other part. The corrugations 6 are largest at the periphery of the receptacle and gradually decrease in size toward the center.

Inside the receptacle are two flat disks 8 and 9 which are supported at their edges on corrugations 6 and between which the eggs are held endwise. Disks 8 and 9 may be made of suitable semi-stiff material such as corrugated paperboard and are of such size that when resting on the inner faces of corrugations 6 they are spaced apart a distance to receive the eggs snugly between them. Between disks 8 and 9 is a third disk 10 which serves as an egg holder and spacer. It may be made of pasteboard and at spaced points in it are openings 11 at the edges of which are tongues 12. Tongues 12 are formed from the material of the opening and are turned in opposite directions around the openings to engage with the sides of the eggs. In the present instance each opening is formed by slotting out eight tongues, and four tongues are then turned up and four down, every other tongue extending in the same direction. In Fig. 1, the appearance of tongues 12 in one of the openings before an egg is inserted in the opening is indicated at 13 by the dotted lines. It will be understood of course that any suitable number of tongues may be used. The egg-holding disk 10 is supported at its edges on corrugations 6 and is of such size as to be held firmly against either sidewise or up and down movement.

In packing the container, and referring particularly to the receptacle as seen in Fig. 2, the part 3 may be placed on a support, the disk 8 put in it and then the disk 10. The eggs which are indicated at 14 are then inserted into the openings 11 between the tongues 12. This may be done readily by bending up every other tongue, slipping one end of an egg, preferably the small end, between them and then pushing the egg downward. This serves to push the other tongues downward and to bring the egg into the opening. As the egg is pushed downward, the tongues which have previously been bent upward are spread apart to receive it. The egg is pushed downward until its end engages disk 8. After the eggs are all positioned in holder 10, a disk 9 is placed on top them and the other part 4 put into position. Because of the curved inner surfaces of corrugations 6, disk 9 will be self-centered. The beads 5 will hold the two parts of the casing together although whenever found desirable other or additional fastening or holding means may be provided.

After the eggs are packed as just described they are firmly held edgewise between disks 8 and 9 and are maintained in spaced relation to each other by holding disk 10, the tongues 12 serving to hold the eggs from slipping out of openings 11 in disk 10. The disks 8 and 9 have some degree of flexibility and will give sufficiently to conform to eggs of various sizes. This can readily take place because the disks are supported by corrugations 6 only at spaced intervals around their edges.

The casing is of such thickness and diameter and the corrugations 6 are of such depth that disks 8 and 9 are spaced entirely away from the walls of the casing except at their edges where they engage the corrugations. This is clearly seen from Fig. 2. By this arrangement there is an air space on all sides of the eggs between them and the casing which air space serves as an air cushion to absorb shocks and blows and prevent their being transmitted to the eggs. The continuously curved radially corrugated casing serves also to provide a strong structure which is not easily crushed or dented and which has a tendency by reason of the curved surfaces to minimize the effect of blows and shocks.

In this connection, it will be noted that the edges of disks 8 and 9 rest against the inner surfaces of the inwardly projecting portions of the corrugations which means the inner surfaces of the bottoms of the corrugations as viewed from the outside. This edge is thus well protected for any blows against the container are most likely to be on the outer portions of the corrugations and not at the bottoms of them. Also, because of the corrugations 6, when the two parts of the casing are put together, they cannot turn relatively to each other.

In connection with my container, it is to be noted also that I utilize the central portion for holding eggs as well as the peripheral portion. This means that there is no wasted space and that the container is compact.

Considering the container from a manufacturing standpoint, it will be seen that the two casing parts 3 and 4 may be made alike and that disks 8 and 9 are alike. This means that there are only three different parts to a container, first casing parts, second, the disks 8 and 9 which may be termed end disks, and third, the holding disks 10. Of these parts, the casing parts may be readily pressed up from suitable material while parts 8, 9 and 10 are plain disks except that the latter has tongued holes stamped in it. This means that the construction can be manufactured at a relatively low cost.

In shipping originally, the container may be packed in knocked down condition, the casing parts being nested and the disks stacked one on another. This makes a compact package and is a matter of great importance in connection with a device of this character.

I preferably make the container round and I believe this to be the most satisfactory shape. However, it will be understood that I may make it of other curvilinear shapes if desired. Also it will be understood that my invention is not necessarily limited to the specific arrangement of the disks 8, 9 and 10 illustrated, but that other arrangements may be used.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A container for fragile articles comprising a casing formed of two complementary sections which together form the end and side walls of the casing, the walls of each of said sections having corrugations which extend from the center of the end wall radially outward through the side wall, and supporting means for articles to be packed in the casing, said supporting means being located inside the casing and resting on the inner surfaces of said corrugations.

2. A container for fragile articles comprising a flattened annular casing the walls of which are provided with corrugations which extend from the centers of the ends of the casing radially around the sides of the casing, and article-holding members which are supported on the inner surfaces of said corrugations inside the casing.

3. A container for fragile articles comprising a flattened annular casing provided with corrugations which extend from the centers of the ends of the casing radially around the sides of the casing, and article-holding members which are supported on said corrugations inside the casing, and out of contact with the ends of the casing.

4. An egg-carrying receptacle comprising a curvilinear casing the walls of which are provided with radially-extending corrugations, spaced members in the casing which rest at their edges on the inner surfaces of said corrugations and are adapted to engage the ends of eggs packed in the receptacle, and means for holding eggs in spaced relation to each other.

5. An egg-carrying receptacle comprising a flattened circular casing provided with corrugations which extend radially around the casing from the central portion of one end to the central portion of the other end, and disks in the casing which rest against the corrugations out of contact with the ends of the casing, said disks being spaced apart a distance for holding eggs between them.

6. An egg-carrying receptacle comprising a flattened circular casing provided with corrugations which extend radially around the casing from the central portion of one end to the central portion of the other end, and disks in the casing which rest against the corrugations out of contact with the ends of the casing, said disks being spaced apart a distance for holding eggs between them, and a third disk between said first-named disks for supporting eggs in vertical, spaced relation to each other.

7. A receptacle for fragile articles comprising two complementary parts, each part being provided with corrugations which extend from the center radially outward, and article supporting members in each part which rest on the inner surfaces of said corrugations.

In witness whereof, I have hereto set my hand this 16th day of April, 1924.

DUDLEY M. DIGGS.